US012794228B2

(12) United States Patent
Takeda et al.

(10) Patent No.: US 12,794,228 B2
(45) Date of Patent: Nov. 10, 2026

(54) ENERGY MANAGEMENT SYSTEM AND ENERGY MANAGEMENT METHOD PREDICTING A POWER OUTAGE TIME BASED ON WEATHER INFORMATION

(71) Applicants: KABUSHIKI KAISHA TOSHIBA, Tokyo (JP); TOSHIBA ENERGY SYSTEMS & SOLUTIONS CORPORATION, Kawasaki Kanagawa (JP)

(72) Inventors: Daisuke Takeda, Kawasaki Kanagawa (JP); Kenji Mitsumoto, Setagaya Tokyo (JP); Koji Sasaki, Inagi Tokyo (JP); Koji Toba, Tama Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 353 days.

(21) Appl. No.: 18/415,845

(22) Filed: Jan. 18, 2024

(65) Prior Publication Data

US 2024/0313531 A1 Sep. 19, 2024

(30) Foreign Application Priority Data

Mar. 14, 2023 (JP) ................................ 2023-039933

(51) Int. Cl.
*H02J 3/0012* (2026.01)
*H02J 3/00* (2006.01)
(Continued)

(52) U.S. Cl.
CPC ............ *H02J 3/0012* (2020.01); *H02J 3/003* (2020.01); *H02J 9/06* (2013.01); *H02J 13/10* (2026.01);
(Continued)

(58) Field of Classification Search
CPC ...................................................... H02J 3/003
See application file for complete search history.

(56) References Cited

U.S. PATENT DOCUMENTS

| | | | | |
|---|---|---|---|---|
| 11,539,213 B2 * | 12/2022 | Koguma | ................ | H02J 3/381 |
| 2011/0137482 A1 * | 6/2011 | Toba | ...................... | H02J 3/004 700/291 |

(Continued)

FOREIGN PATENT DOCUMENTS

| | | |
|---|---|---|
| CN | 105743126 A | 7/2016 |
| JP | 2012-228043 A | 11/2012 |

(Continued)

OTHER PUBLICATIONS

IP Australia, Office Action in AU App. No. 2024200204, 6 pages (Nov. 29, 2024).

*Primary Examiner* — Suresh Suryawanshi
(74) *Attorney, Agent, or Firm* — Finnegan, Henderson, Farabow, Garrett & Dunner, LLP

(57) ABSTRACT

An energy management system is disclosed. In the system, a mode identification unit identifies whether a microgrid is in a grid connection mode or in an isolated operation mode. A prediction unit predicts, during the grid connection mode, an amount of demand for electric power in the microgrid and an output amount of renewable energy. The prediction is performed for a case where the grid connection mode is continued and for a case where the grid connection mode is switched to the isolated operation mode. A planning unit creates a facility operation plan for the microgrid to be applied to the grid connection mode and the isolated operation mode. A display I/F unit displays, on a display device in the grid connection mode, operation information representing operation of the microgrid during the isolated operation mode.

9 Claims, 8 Drawing Sheets

(51) Int. Cl.

| | |
|---|---|
| ***H02J 9/06*** | (2006.01) |
| ***H02J 13/10*** | (2026.01) |
| ***H02J 13/12*** | (2026.01) |
| *H02J 101/20* | (2026.01) |
| *H02J 103/35* | (2026.01) |

(52) U.S. Cl.
CPC ........... *H02J 13/12* (2026.01); *H02J 2101/20* (2026.01); *H02J 2103/35* (2026.01)

(56) References Cited

U.S. PATENT DOCUMENTS

| | | | | |
|---|---|---|---|---|
| 2012/0283888 | A1 | 11/2012 | Mao et al. | |
| 2013/0049468 | A1 | 2/2013 | Iwasaki et al. | |
| 2014/0042811 | A1 | 2/2014 | Myamoto et al. | |
| 2017/0322578 | A1* | 11/2017 | Baone | G05F 1/66 |
| 2022/0069576 | A1* | 3/2022 | Hyun | H02J 3/0012 |
| 2023/0170700 | A1 | 6/2023 | Hamaguchi et al. | |

FOREIGN PATENT DOCUMENTS

| | | | | | |
|---|---|---|---|---|---|
| JP | 2014-183699 | A | | 9/2014 | |
| JP | 2014-233136 | A | | 12/2014 | |
| JP | 2015-156785 | A | | 8/2015 | |
| JP | 2021-184682 | A | | 12/2021 | |
| JP | 2021193861 | A | * | 12/2021 | |
| KR | 102444388 | B1 | * | 9/2022 | G06Q 50/06 |
| WO | WO 2011/142330 | A1 | | 11/2011 | |
| WO | WO-2016017025 | A1 | * | 2/2016 | F24F 11/89 |
| WO | WO-2018131174 | A1 | * | 7/2018 | G06Q 10/06 |
| WO | WO 2022/038920 | A1 | | 2/2022 | |

* cited by examiner

ENERGY MANAGEMENT SYSTEM AND ENERGY MANAGEMENT METHOD PREDICTING A POWER OUTAGE TIME BASED ON WEATHER INFORMATION

CROSS-REFERENCE TO RELATED APPLICATIONS

This application is based upon and claims the benefit of priority from Japanese Patent Application No. 2023-039933, filed on Mar. 14, 2023; the entire contents of which are incorporated herein by reference.

FIELD

Embodiments of the present disclosure relate generally to an energy management system, an energy management method, and a recording medium.

BACKGROUND

A microgrid has been known. The microgrid is capable of switching between a normal state (grid connection) and an emergency state (system outage or isolated operation). With regard to the microgrid, various techniques for improving operation of a storage battery have been developed. For example, load prediction of an emergency state is performed in the normal state in order to prevent power supplied by the storage battery from running out in the emergency state.

However, facilities constituting the microgrid include not only the storage battery but also a power generator and renewable energy such as photovoltaic power generation and biogas. Therefore, it has been demanded to further improve the efficiency of operation of the microgrid utilizing them in the emergency state, and also demanded to supply power for a long time.

DETAILED DESCRIPTION

An energy management system according to an embodiment of the present disclosure includes a hardware processor connected to a memory. The hardware processor is configured to function as a mode identification unit, a prediction unit, a planning unit, and a display I/F unit. The mode identification unit serves to identify whether a microgrid is in a grid connection mode or in an isolated operation mode. The grid connection mode is an operation mode in which power is supplied from a power system. The isolated operation mode is an operation mode in which power supply from the power system to the microgrid is stopped and the microgrid performs isolated operation. The prediction unit serves to predict, during the grid connection mode, an amount of demand for electric power in the microgrid and an output amount of renewable energy. The prediction is performed for a case where the grid connection mode is continued and for a case where the grid connection mode is switched to the isolated operation mode. The planning unit serves to create a facility operation plan for the microgrid to be applied to the grid connection mode and the isolated operation mode, on the basis of results of the prediction performed by the prediction unit. The display I/F unit serves to display, on a display device in the grid connection mode, operation information based on the facility operation plan. The operation information represents operation of the microgrid during the isolated operation mode.

Hereinafter, an energy management system, an energy management method, and a recording medium according to the present embodiment will be described with reference to the accompanying drawings.

Figure 1:
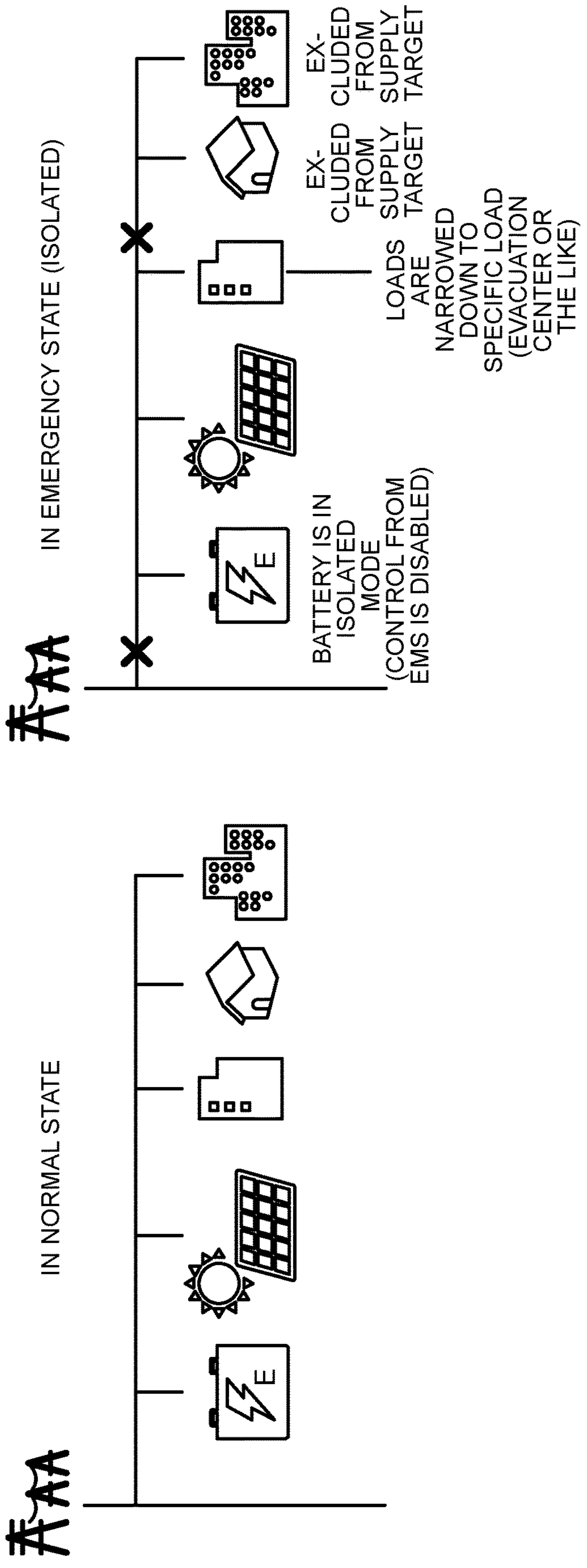
FIG. 1 is a diagram for describing an example of a microgrid to which an energy management system according to the present embodiment is applied.

FIG. 1 is a diagram for describing an example of a microgrid to which an energy management system according to the present embodiment is applied. As illustrated in FIG. 1, in a normal state, the energy management system according to the present embodiment receives power supply from a power system and supplies the power to facilities and the like in a microgrid. The normal state corresponds to a grid connection mode in which the microgrid receives power supply from the power system.

As illustrated in FIG. 1, in an emergency state, the energy management system according to the present embodiment supplies power from a power generator or a storage battery in the microgrid to the facilities in the microgrid. The emergency state corresponds to an isolated operation mode in which power supply from the power system to the microgrid is stopped and the microgrid performs isolated operation.

In the microgrid according to the present embodiment, as illustrated in FIG. 1, in the emergency state, loads to which power is supplied from the power generator or the storage battery in the microgrid may be narrowed down to a specific load (for example, an evacuation center). The remaining loads may be excluded from supply targets, and the power may not be supplied to the remaining ones.

Figure 2:
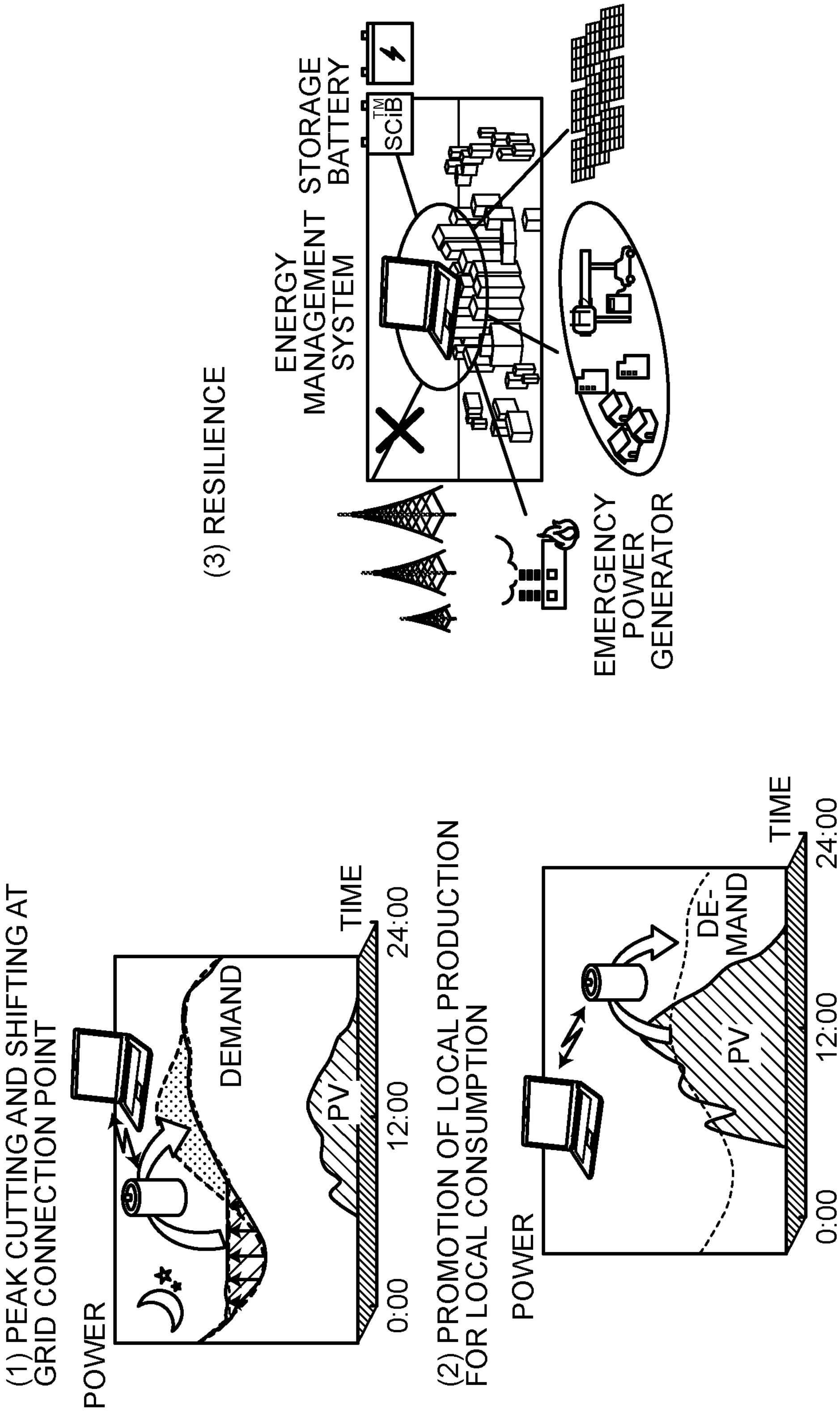
FIG. 2 is a diagram for describing an example of a role of the energy management system according to the present embodiment.

FIG. 2 is a diagram for describing an example of a role of the energy management system according to the present embodiment. The energy management system according to the present embodiment carries out the roles (1) to (3) listed below.

(1) The energy management system according to the present embodiment predicts an amount of demand for electric power, creates a facility operation plan, and performs peak cutting and peak shifting at the grid connection point on the basis of the facility operation plan. With this configuration, it is possible to prevent exhaustion of the storage battery in the microgrid, and to operate the microgrid so as to maintain the contract power. Therefore, economical operation of the microgrid can be implemented to accord with a price differential between day and night.

(2) With the energy management system according to the present embodiment, by promoting local production for local consumption of energy, surplus of renewable energy can be effectively utilized without waste, and reverse power flow can be suppressed. (3) With the energy management system according to the present embodiment, isolated operation is enabled separately from the power system during the isolated operation mode.

Figure 3:
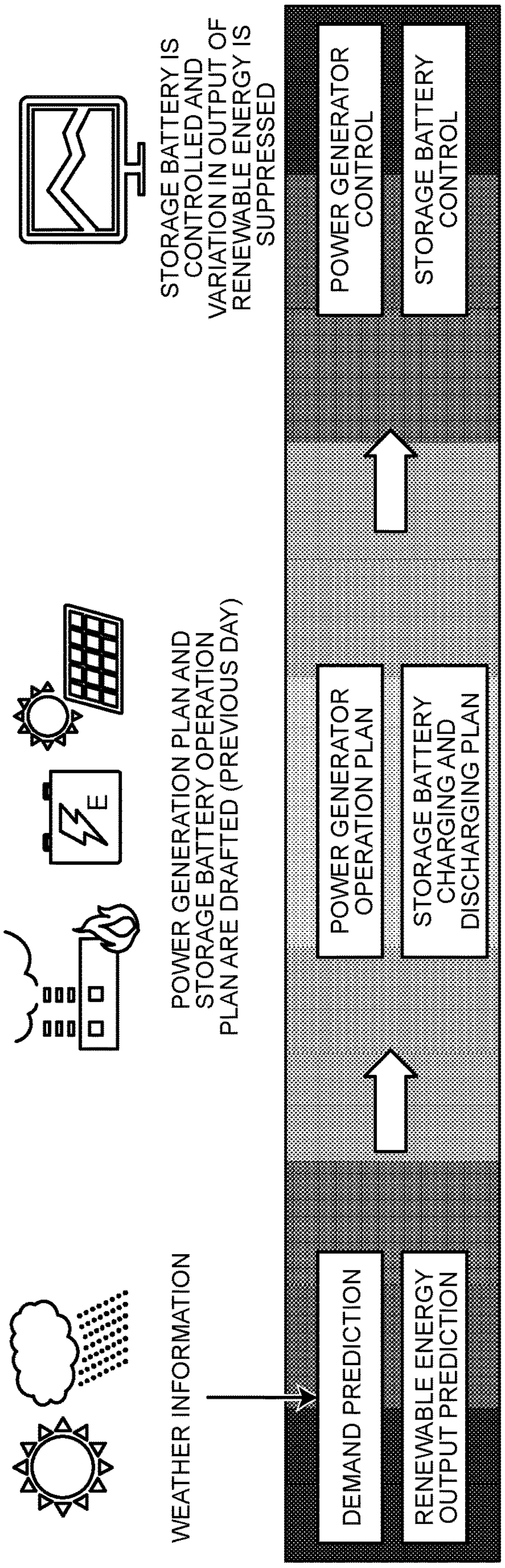
FIG. 3 is a diagram for describing an example of a main function of the energy management system according to the present embodiment.

FIG. 3 is a diagram for describing an example of a main function of the energy management system according to the present embodiment. The energy management system according to the present embodiment predicts an amount of demand for electric power in the microgrid and an output amount of renewable energy, creates a facility operation plan on the basis of the prediction result, and economically optimizes the operation of the microgrid on the basis of the facility operation plan.

Specifically, the power generator and the storage battery are controlled on the basis of: a power generation plan for the power generator, and a charging and discharging plan for the storage battery.

Figure 4:
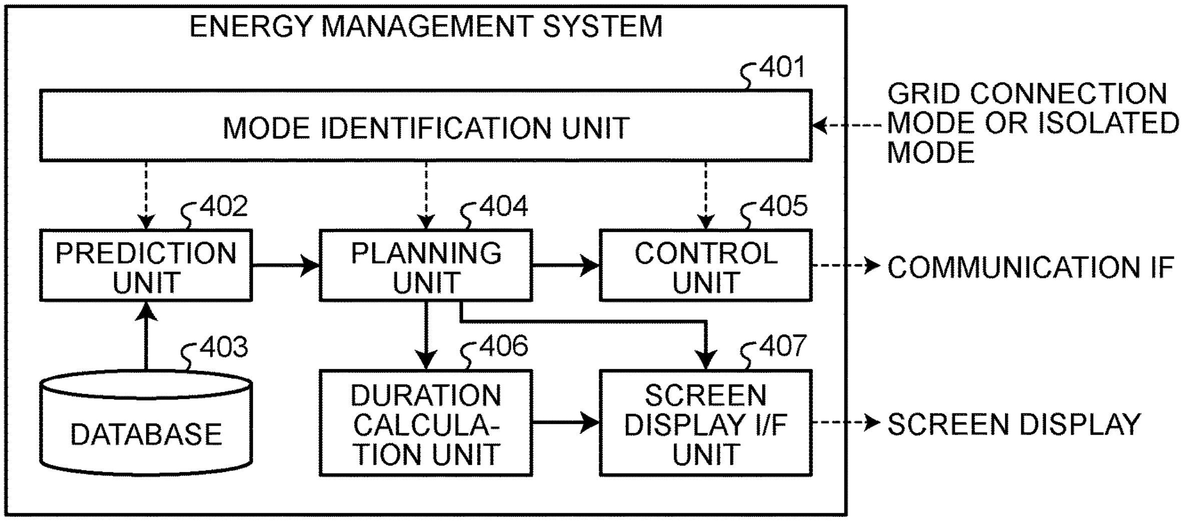
FIG. 4 is a diagram illustrating an example of a functional configuration of the energy management system according to the present embodiment.

FIG. 4 is a diagram illustrating an example of a functional configuration of the energy management system according to the present embodiment. As illustrated in FIG. 4, the energy management system according to the present embodiment includes a mode identification unit 401, a prediction unit 402, a database 403, a planning unit 404, a control unit 405, a duration calculation unit 406, and a screen display I/F unit 407.

The database 403 stores information necessary for predicting an amount of demand for electric power in the microgrid and an output amount of renewable energy, for example, weather information, past record of amount of demand for electric power of the microgrid, past record of output amounts of renewable energy, and so forth.

The mode identification unit 401 is an example of a mode identification unit configured to identify whether the microgrid is in the grid connection mode or the isolated operation mode. The mode identification unit 401 may identify whether the microgrid is in the grid connection mode or the isolated operation mode on the basis of, for example, determination of whether power is supplied from the power system to the microgrid, a state of a breaker that is provided at an inlet of the microgrid and capable of cutting off power supply from the power system, an input from an operator, etc.

In the present embodiment, the prediction unit 402 predicts an amount of demand for electric power in the microgrid in the grid connection mode on the basis of the weather information, the history of demand for electric power, etc. stored in the database 403. Additionally, at a predetermined timing, the prediction unit 402 predicts an amount of demand for electric power in the microgrid, which is intended for the isolated operation mode. The prediction unit 402 is an example of a prediction unit configured to predict, during the grid connection mode, an amount of demand for electric power in the microgrid and an output amount of the renewable energy, the prediction being performed for a case where the grid connection mode is continued and a case where the grid connection mode is switched to the isolated operation mode. In the present embodiment, during the grid connection mode, the prediction unit 402 may predict a value obtained by subtracting the renewable energy from a load (for example, a specific load such as a shelter) in the microgrid during the isolated operation mode as the net amount of the demand for electric power in the microgrid during the isolated operation mode.

The planning unit 404 is an example of a planning unit configured to create a facility operation plan (for example, an operation (charging and discharging) plan for the storage battery) for the microgrid in the isolated operation mode on the basis of the prediction result of the net amount of demand for electric power obtained by the prediction unit 402. The planning unit 404 creates the facility operation plan for the microgrid in the grid connection mode and the isolated operation mode on the basis of the prediction results of the amount of demand for electric power and the output amount of the renewable energy. The planning unit 404 may calculate an amount of power required for the load in the isolated operation mode (for example, a net amount of the demand of every time zone) on the basis of the prediction result of the net amount of demand for electric power obtained by the prediction unit 402. Then, the planning unit 404 may create an operation plan for the storage battery on the basis of the calculated power amount.

In addition, the planning unit 404 may periodically update the facility operation plan for the microgrid, which is intended for the isolated operation mode. In addition, the planning unit 404 may periodically update, during the grid connection mode, the facility operation plan for the microgrid intended for the isolated operation mode. Alternatively, the planning unit 404 may update the facility operation plan at an optional timing given by the operator of the microgrid.

The control unit 405 controls the power generator and the storage battery on the basis of the facility operation plan created by the planning unit 404 to operate the microgrid.

The duration calculation unit 406 is an example of a duration calculation unit configured to calculate a continuable time on the basis of the prediction result obtained by the prediction unit 402. The continuable time refers to the time during which the microgrid can continue the isolated operation in the isolated operation mode (for example, the time until the remaining amount of the storage battery reaches the operation lower limit). The duration calculation unit 406 may calculate the continuable time of the isolated operation mode in a case where the mode is switched to the isolated operation mode after a predetermined time N (after N hours from the current time). The predetermined time N is a preset time, and may be, for example, the time until a planned power outage is carried out. In the present embodiment, the duration calculation unit 406 may predict the time for power outage on the basis of the weather information and set the predetermined time N on the basis of the power outage time.

The continuable time is not limited to a continuable time in a case where the microgrid is immediately brought into the emergency state (isolated operation mode), but may be a continuable time in a case where the microgrid is brought into the emergency state after the predetermined time N. In that case, the duration calculation unit 406 predicts a continuable time in the normal state until reaching the predetermined time N and calculates a continuable time in the emergency state after the predetermined time N. For example, the duration calculation unit 406 predicts the power outage time on the basis of the weather information, sets a time until the predicted power outage time to the predetermined time N, and calculates the continuable time after the predetermined time N.

The screen display I/F unit 407 is an example of a display I/F unit configured to display, on a display device in the grid connection mode, operation information based on the facility operation plan created by the planning unit 404. The operation information represents the operation of the microgrid during the isolated operation mode. In addition, the screen display I/F unit 407 displays operation information on the display device on the basis of the updated facility operation plan. The screen display I/F unit 407 may simultaneously display the operation information in the grid connection mode and the operation information in the isolated operation mode.

The operation information may include the continuable time calculated by the duration calculation unit 406. Thereby, the operator of the microgrid can recognize the startup timing of an emergency power generator and take measures, such as charging the storage battery, in advance to extend the continuable time. Therefore, power supply can be smoothly performed in an emergency state. In the present embodiment, when the continuable time is displayed as the operation information, the screen display I/F unit 407 may acquire the continuable time via the duration calculation unit 406 and display the operation information including the acquired continuable time on the display device. In addition, the power outage time is determined in advance in the case of the planned power outage or the like. Therefore, when the continuable time displayed on the screen is shorter than the power outage time, the power supply can be continued during the planned power outage, and the influence of the planned power outage can be minimized by taking the above measures. Moreover, in a case where the continuable time of the isolated operation mode is already sufficient, it is possible to improve the efficiency such as transferring the reserve power (for example, the charge and discharge reserve power of the storage battery) to the economical operation (for example, the storage battery is discharged in a time zone in which demand for electric power is at a peak and the power is supplied to other microgrids).

In addition, the operation information may include a time until power can be supplied to the load in the isolated operation mode. For example, the operation information may include a time in the isolated operation mode from when the storage battery is charged to when power can be supplied from the storage battery to the microgrid.

In addition, the operation information may include the facility operation plan for the microgrid in the isolated operation mode. The facility operation plan is, for example, a charging and discharging plan for the storage battery, an output suppression plan for renewable energy, a demand suppression plan (demand response), and so forth. The facility operation plan may be a plan that the storage battery is charged by photovoltaic power generation during the isolated operation mode and then power is supplied from the storage battery to the microgrid. In the present embodiment, in a case where the facility operation plan is displayed as the operation information, the screen display I/F unit 407 may directly acquire the facility operation plan created by the planning unit 404 from the planning unit 404 without the duration calculation unit 406, and display the facility operation plan on the display device.

The facility operation plan may include a time until power can be supplied to the load in the isolated operation mode. In addition, the facility operation plan may be a facility operation plan for the microgrid for a case of entering the isolated operation mode after the predetermined time N.

In addition, when a plan for introducing an emergency power generator is input, the facility operation plan may be modified on the basis of the plan for introducing an emergency power generator. In this case, the facility operation plan may be modified every time when the plan for introducing an emergency power generator is changed. In addition, when an emergency load range (for example, a range including only a shelter) is input, the facility operation plan may be modified on the basis of the emergency load range. Also in this case, the facility operation plan may be modified every time when the emergency load range is changed.

Figure 5:
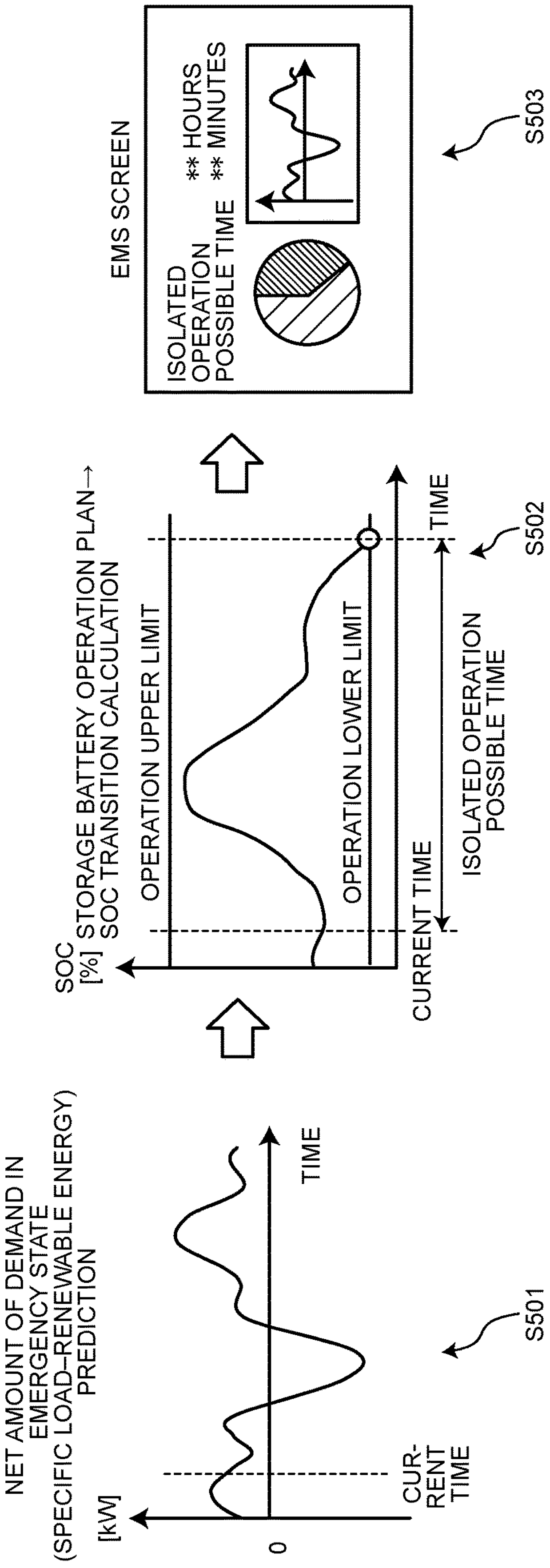
FIG. 5 is a diagram for describing an example of processing of calculating operation information in the energy management system according to the present embodiment.

FIG. 5 is a diagram for describing an example of processing of calculating operation information in the energy management system according to the present embodiment. In the present embodiment, during the grid connection mode, the prediction unit 402 predicts a value obtained by subtracting the renewable energy from the specific load in the microgrid, as the net amount of demand for electric power in the microgrid during the emergency state (that is, the isolated operation mode) (Step S501).

Next, the planning unit 404 calculates a facility operation plan for the storage battery in the microgrid in the isolated operation mode on the basis of the net amount of demand for electric power in the microgrid predicted by the prediction unit 402, and determines a transition of a state of charge (SOC) of the storage battery on the basis of the facility operation plan for the storage battery (Step S502). Moreover, the duration calculation unit 406 calculates the continuable time on the basis of the transition of the SOC of the storage battery (Step S502). Then, the screen display I/F unit 407 displays, on the display device, an indication of the calculated continuable time (isolated operation possible time), a graph of the net amount of demand for electric power in the microgrid during the emergency state, etc. as the operation information (Step S503).

Figure 6:
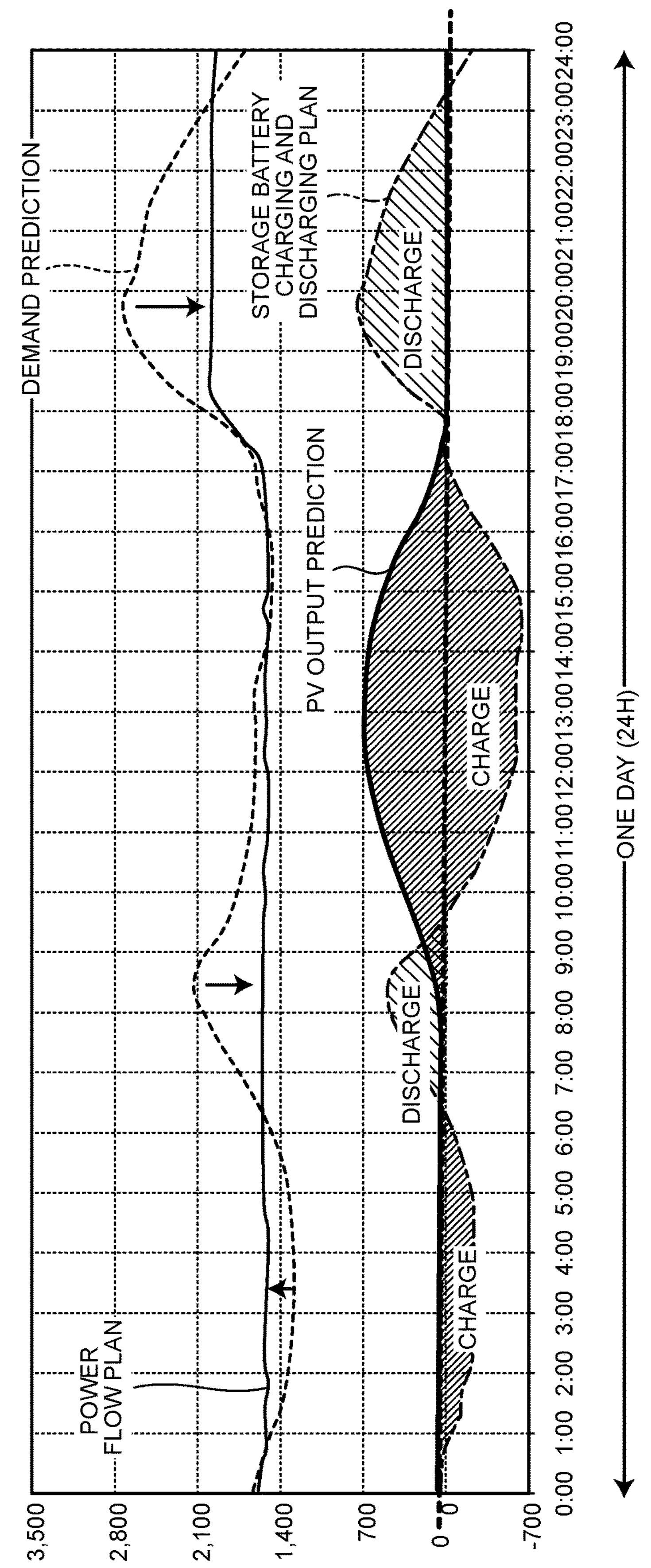
FIG. 6 is a diagram illustrating an example of operation information displayed in the energy management system according to the present embodiment.

FIG. 6 is a diagram illustrating an example of operation information displayed in the energy management system according to the present embodiment. As illustrated in FIG. 6, the screen display I/F unit 407 may display, in time series, the power flow plan for the microgrid, the amount of demand for electric power predicted by the prediction unit 402, the charging and discharging plan for the storage battery, the predicted value of the output of the renewable energy (in FIG. 6, photovoltaic power generation: PV), etc., as the operation information for one day.

Figure 7:
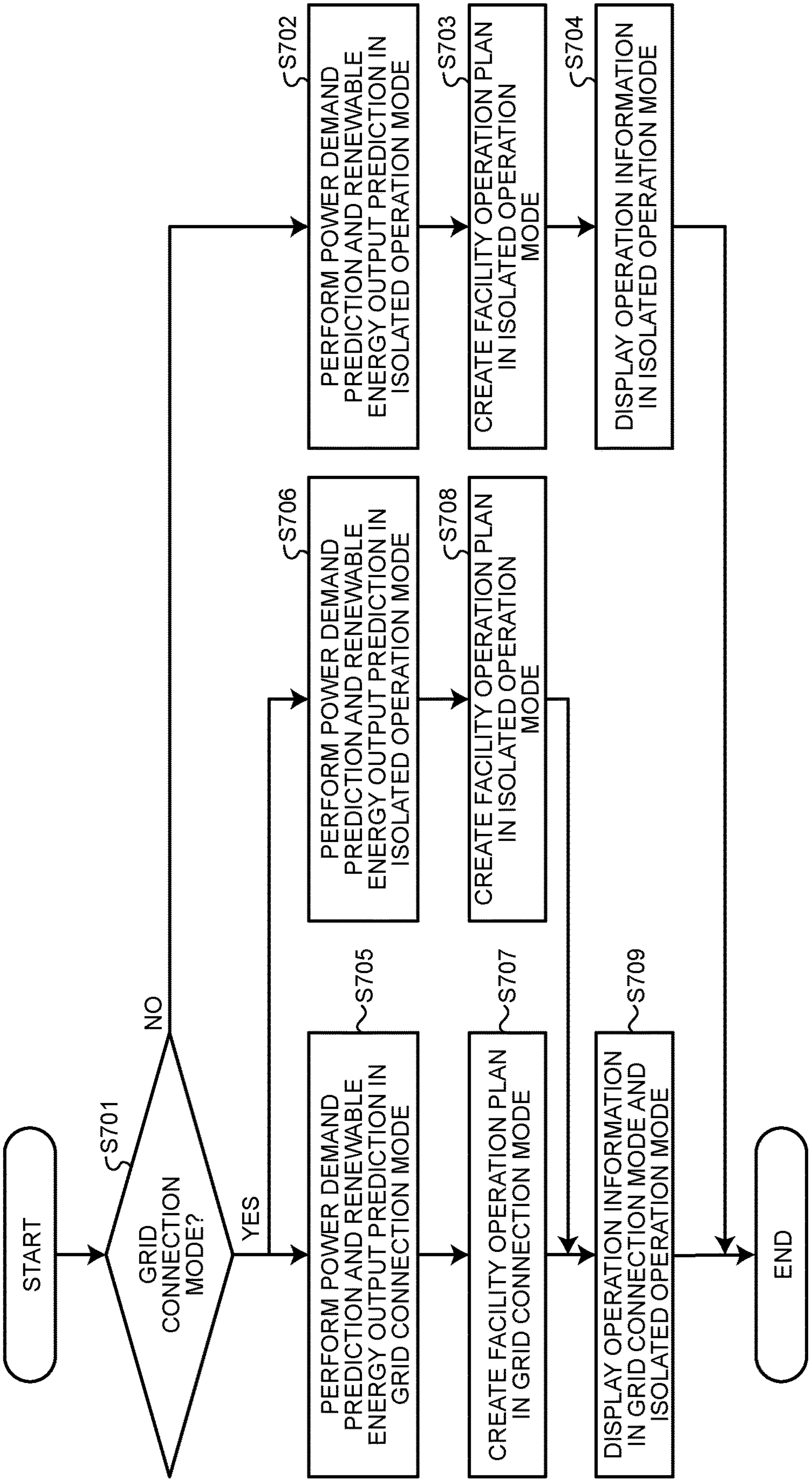
FIG. 7 is a flowchart illustrating an example of a flow of processing of displaying operation information in the energy management system according to the present embodiment.

FIG. 7 is a flowchart illustrating an example of a flow of processing of displaying operation information in the energy management system according to the present embodiment. In the present embodiment, the mode identification unit 401 identifies whether the microgrid is in the grid connection mode (Step S701). In response to determining that the microgrid is not in the grid connection mode (Step S701: No), the prediction unit 402 predicts an amount of demand for electric power and an output amount of renewable energy in the isolated operation mode (Step S702). Next, the planning unit 404 creates the facility operation plan for the isolated operation mode on the basis of the prediction results of the amount of demand for electric power and the output amount of the renewable energy in the isolated operation mode (Step S703). Then, the screen display I/F unit 407 displays, on the display device, the operation information of the microgrid in the isolated operation mode on the basis of the facility operation plan for the isolated operation mode (Step S704).

In response to determining that the microgrid is in the grid connection mode (Step S701: Yes), the prediction unit 402 predicts an amount of demand for electric power and an output amount of the renewable energy in each of the grid connection mode and the isolated operation mode (Step S705 and Step S706). Next, the planning unit 404 creates a facility operation plan for the grid connection mode on the basis of the prediction results of the amount of demand for electric power and the output amount of the renewable energy in the grid connection mode, and creates a facility operation plan for the isolated operation mode on the basis of the prediction results of the amount of demand for electric power and the output amount of the renewable energy in the isolated operation mode (Step S707 and Step S708). Then, the screen display I/F unit 407 displays, on the display device, the operation information of the microgrid in each of the grid connection mode and the isolated operation mode on the basis of the facility operation plan for each of the grid connection mode and the isolated operation mode (Step S709).

Figure 8:
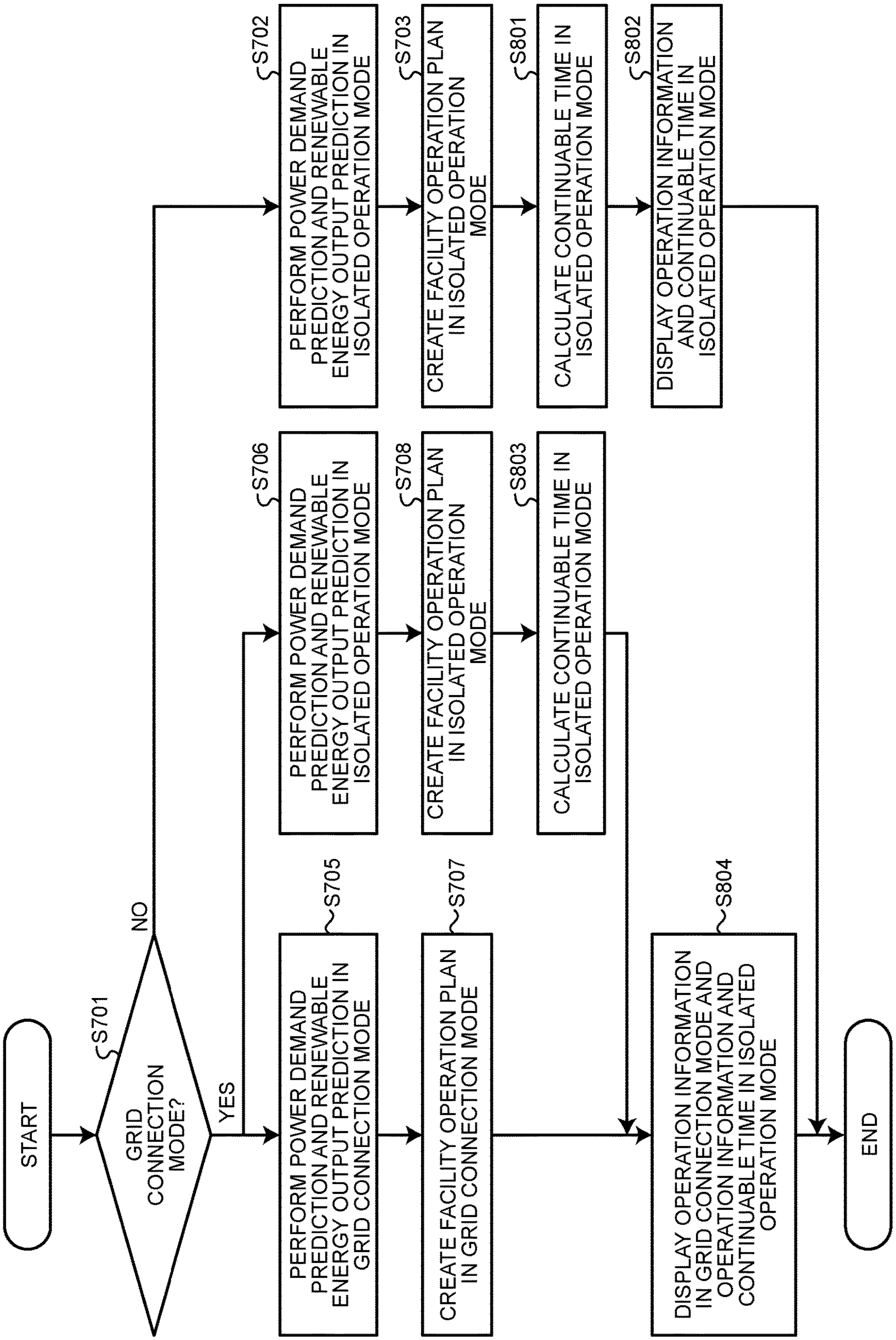
FIG. 8 is a flowchart illustrating another example of a flow of processing of displaying operation information in the energy management system according to the present embodiment.

FIG. 8 is a flowchart illustrating another example of a flow of processing of displaying operation information in the energy management system according to the present embodiment. In the description below, description of processing similar to the processing illustrated in FIG. 7 is omitted.

In the present embodiment, when the facility operation plan for the isolated operation mode is created in a case where the microgrid is not in the grid connection mode (Step S703), the duration calculation unit 406 calculates the continuable time of the isolated operation mode (Step S801). Next, the screen display I/F unit 407 displays the operation information including the continuable time on the display device (Step S802).

When the facility operation plan for the isolated operation mode is created in a case where the microgrid is in the grid connection mode (Step S708), the duration calculation unit 406 calculates the continuable time of the isolated operation mode (Step S803). Then, the screen display I/F unit 407 displays, on the display device, the operation information in the grid connection mode and the operation information in the isolated operation mode including the calculated continuable time (Step S804).

As described above, with the energy management system according to the present embodiment, the operator of the microgrid can recognize the startup timing of an emergency power generator and take measures such as charging the storage battery in advance to extend the continuable time. Therefore, power supply can be smoothly performed in an emergency state. In addition, the power outage time is determined in advance in the case of the planned power outage or the like. Therefore, when the continuable time displayed on the screen is shorter than the power outage time, the power supply can be continued during the planned power outage, and the influence of the planned power outage can be minimized by taking the above measures. Moreover, in a case where the continuable time of the isolated operation is already sufficient, it is possible to improve efficiency such as transferring reserve power to economic operation.

The energy management system of the present embodiment includes a control device such as a central processing unit (CPU), a storage device such as read only memory (ROM) and random access memory (RAM), an external storage device such as a hard disk drive (HDD) and a CD drive device, a displaying device such as a display device, and an input device such as a keyboard and a mouse. The energy management system has a hardware configuration using a normal computer.

A computer program executed by the energy management system of the present embodiment is provided by being recorded in a computer-readable recording medium such as a CD-ROM, a flexible disk (FD), a CD-R, and a digital versatile disk (DVD) as a file in an installable format or an executable format.

In addition, the computer program executed by the energy management system of the present embodiment may be configured to be stored in a computer connected to a network such as the Internet and provided by being downloaded via the network. In addition, the computer program executed by the energy management system of the present embodiment may be configured to be provided or distributed via a network such as the Internet.

In addition, the computer program of the present embodiment may be configured to be provided by being incorporated in ROM or the like in advance. The computer program executed by the energy management system of the present embodiment has a module configuration including the above-described units (mode identification unit 401, prediction unit 402, planning unit 404, control unit 405, duration calculation unit 406, and screen display I/F unit 407), and as actual hardware, an example of a processor such as a CPU reads the computer program from the above-described storage medium and executes the computer program. The above-described units are loaded onto a main storage device, and the mode identification unit 401, the prediction unit 402, the planning unit 404, the control unit 405, the duration calculation unit 406, and the screen display I/F unit 407 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An energy management system comprising:

a hardware processor connected to a memory, the hardware processor being configured to function as:

a mode identification unit to identify whether a microgrid is in a grid connection mode or in an isolated operation mode, the grid connection mode being an operation mode in which power is supplied from a power system, the isolated operation mode being an operation mode in which power supply from the power system to the microgrid is stopped and the microgrid performs isolated operation;

a prediction unit to predict, during the grid connection mode, an amount of demand for electric power in the microgrid and an output amount of renewable energy, the prediction being performed for a case where the grid connection mode is continued and for a case where the grid connection mode is switched to the isolated operation mode;

a planning unit to create a facility operation plan for the microgrid to be applied to the grid connection mode and the isolated operation mode, on the basis of results of the prediction performed by the prediction unit;

a display I/F unit to display, on a display device in the grid connection mode, operation information based on the facility operation plan, the operation information representing operation of the microgrid during the isolated operation mode; and a duration calculation unit configured to calculate, on the basis of the amount of demand for electric power, a continuable time during which the microgrid can continue the isolated operation in the isolated operation mode, wherein the operation information includes the continuable time, the continuable time is for a case of entering the isolated operation mode after a predetermined time from a current time, and the duration calculation unit is further configured to perform the calculation of the continuable time by predicting a power outage time based on weather information, and setting, as the predetermined time from the current time, a time from the current time until the predicted power outage time.

2. The energy management system according to claim 1, wherein the operation information further includes a time until power can be supplied to a load during the isolated operation mode.

3. The energy management system according to claim 1, wherein the operation information includes the facility operation plan for the microgrid in the isolated operation mode.

4. The energy management system according to claim 3, wherein the facility operation plan includes a time until power can be supplied to a load during the isolated operation mode.

5. The energy management system according to claim 3, wherein the facility operation plan is a facility operation plan for the microgrid for a case of entering the isolated operation mode after a predetermined time.

6. The energy management system according to claim 1, wherein the planning unit periodically updates the facility operation plan, and the display I/F unit displays the operation information on the display device on the basis of the facility operation plan updated by the planning unit.

7. The energy management system according to claim 1, wherein the planning unit updates the facility operation plan at an optional timing given by an operator, and the display I/F unit displays the operation information on the display device on the basis of the facility operation plan updated by the planning unit.

8. An energy management method implemented by a computer as an energy management system, the method comprising:

identifying whether a microgrid is in a grid connection mode or in an isolated operation mode, the grid connection mode being an operation mode in which power is supplied from a power system, the isolated operation mode being an operation mode in which power supply from the power system to the microgrid is stopped and the microgrid performs isolated operation;

predicting, during the grid connection mode, an amount of demand for electric power in the microgrid and an output amount of renewable energy, the predicting being performed for a case where the grid connection mode is continued and for a case where the grid connection mode is switched to the isolated operation mode;

creating a facility operation plan for the microgrid to be applied to the grid connection mode and the isolated operation mode, on the basis of results of the predicting;

displaying, on a display device in the grid connection mode, operation information based on the facility operation plan, the operation information representing operation of the microgrid during the isolated operation mode; and calculating, on the basis of the amount of demand for electric power, a continuable time during which the microgrid can continue the isolated operation in the isolated operation mode, wherein the operation information includes the continuable time, the continuable time is for a case of entering the isolated operation mode after a predetermined time from a current time, and the calculating the continuable time includes predicting a power outage time based on weather information, and setting, as the predetermined time, a time from the current time until the predicted power outage time.

9. A non-transitory computer-readable recording medium on which programmed instructions are recorded, the instructions causing a computer to execute processing, the processing comprising:

identifying whether a microgrid is in a grid connection mode or in an isolated operation mode, the grid connection mode being an operation mode in which power is supplied from a power system, the isolated operation mode being an operation mode in which power supply from the power system to the microgrid is stopped and the microgrid performs isolated operation;

predicting, during the grid connection mode, an amount of demand for electric power in the microgrid and an output amount of renewable energy, the predicting being performed for a case where the grid connection mode is continued and for a case where the grid connection mode is switched to the isolated operation mode;

creating a facility operation plan for the microgrid to be applied to the grid connection mode and the isolated operation mode, on the basis of results of the predicting;

displaying, on a display device in the grid connection mode, operation information based on the facility operation plan, the operation information representing operation of the microgrid during the isolated operation mode; and calculating, on the basis of the amount of demand for electric power, a continuable time during which the microgrid can continue the isolated operation in the isolated operation mode, wherein the operation information includes the continuable time, the continuable time is for a case of entering the isolated operation mode after a predetermined time from a current time, and the calculating of the continuable time includes predicting a power outage time based on weather information, and setting, as the predetermined time, a time from the current time until the predicted power outage time.

* * * * *